(12) United States Patent
Wiemker et al.

(10) Patent No.: US 12,555,210 B2
(45) Date of Patent: Feb. 17, 2026

(54) SUPPRESSION OF TAGGED ELEMENTS IN MEDICAL IMAGES

(71) Applicant: KONINKLIJKE PHILIPS N.V., Eindhoven (NL)

(72) Inventors: Rafael Wiemker, Kisdorf (DE); Amar Chandra Dhanantwari, Solon, OH (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 306 days.

(21) Appl. No.: 18/037,333

(22) PCT Filed: Nov. 15, 2021

(86) PCT No.: PCT/EP2021/081632
§ 371 (c)(1),
(2) Date: May 17, 2023

(87) PCT Pub. No.: WO2022/106331
PCT Pub. Date: May 27, 2022

(65) Prior Publication Data
US 2024/0013355 A1 Jan. 11, 2024

Related U.S. Application Data

(60) Provisional application No. 63/115,950, filed on Nov. 19, 2020.

(30) Foreign Application Priority Data

Mar. 1, 2021 (EP) .................................... 21159884

(51) Int. Cl.
*G06T 5/94* (2024.01)
*G06T 5/50* (2006.01)
*G06T 5/70* (2024.01)

(52) U.S. Cl.
CPC ................. *G06T 5/94* (2024.01); *G06T 5/50* (2013.01); *G06T 5/70* (2024.01);
(Continued)

(58) Field of Classification Search
CPC .... G06T 5/94; G06T 5/50; G06T 5/70; G06T 2207/10081; G06T 2207/20081;
(Continued)

(56) References Cited

U.S. PATENT DOCUMENTS 7,961,967 B2 6/2011 Yoshida et al.
10,438,351 B2 10/2019 Reicher
(Continued)

FOREIGN PATENT DOCUMENTS

CN 101116089 A * 1/2008 ........... G06K 9/4614
CN 102176229 A 9/2011
(Continued)

OTHER PUBLICATIONS

PCT International Search Report, International application No. PCT/EP2021/081632, Mar. 10, 2022.
(Continued)

*Primary Examiner* — Jose L Couso
(74) *Attorney, Agent, or Firm* — Larry Liberchuk (57) ABSTRACT

A mechanism for reducing the appearance of tagged elements in a medical image. This is achieved by processing the medical image to generate a separate, suppression image that contains only the tagged elements. The medical image and the suppression image are then combined to reduce the appearance of the tagged elements in the medical image. This can be achieved through modification of the suppressed image, before the combination, and/or weighting of the medical image and the suppression image during combination.

14 Claims, 4 Drawing Sheets

(52) U.S. Cl.
CPC .............. *G06T 2207/10081* (2013.01); *G06T 2207/20081* (2013.01); *G06T 2207/20182* (2013.01); *G06T 2207/20224* (2013.01); *G06T 2207/30028* (2013.01)

(58) Field of Classification Search
CPC . G06T 2207/20182; G06T 2207/20224; G06T 2207/30028; G06T 7/0012; G06T 2207/30032; G06T 2210/41; G06T 7/136; G06T 11/008; G06T 19/20; G06T 7/49; G06T 2207/10088; G06T 2207/10032; G06T 2207/20212; G06T 2207/301; G06T 2207/30104; G06T 2211/404; G06T 2207/10116; G06T 2207/10072; G06T 2207/20221; G06T 2207/30008; G06T 2207/30048; A61B 5/4255; A61B 5/055; A61B 6/00; A61B 6/03; A61B 6/4035; A61B 6/5205; A61B 6/5211; A61B 6/5217; A61B 6/5258; A61B 6/583; A61B 8/0883; A61B 8/463; A61B 8/481; A61B 8/5246; G06V 10/457; G06V 2201/03; G06V 2201/032; G06V 10/764; G06V 10/993; G16H 30/20; G16H 30/40; G16H 30/60; G16H 50/20
See application file for complete search history.

(56) References Cited

U.S. PATENT DOCUMENTS

| 10,677,871 | B2 | 6/2020 | Helle |
| 2005/0256399 | A1 | 11/2005 | Sirohey |
| 2006/0215896 | A1 | 9/2006 | Sirohey |
| 2007/0071298 | A1 | 3/2007 | Kiraly |
| 2008/0118133 | A1* | 5/2008 | Sirohey ................ G06T 11/008 |
| | | | 382/131 |
| 2010/0128036 | A1 | 5/2010 | Johnson |
| 2011/0013815 | A1 | 1/2011 | Gundel |

FOREIGN PATENT DOCUMENTS

| WO | WO2007046019 A1 | 4/2007 |
| WO | WO2018224363 A1 | 12/2018 |

OTHER PUBLICATIONS

Liu J. et al., "Scale-Based Scatter Correction for Computer-Aided Polyp Detection in CT Colonography", Medical Physics, AIP, Melville, NY, US, vol. 35, No. 12, Nov. 18, 2008 (Nov. 18, 2008), pp. 5664-5671, XP012115858.

D'angelo T. et al., "Dual Energy Computed Tomography Virtual Monoenergetic Imaging: Technique and Clinical Applications", The British Journal of Radiology, 92.1098 (2019): 20180546, Jun. 1, 2019.

* cited by examiner

SUPPRESSION OF TAGGED ELEMENTS IN MEDICAL IMAGES

FIELD OF THE INVENTION

The present invention relates to the field of medical imaging, and in particular to the suppression of tagged elements in medical images.

BACKGROUND OF THE INVENTION

There is an increasing usage of medical images to assess the condition of a patient/individual. It is reasonably common for medical procedures to use a contrast agent to be used to facilitate identification of non-structural objects (e.g. a stool, some fluid/blood or a bolus) in a medical image of a patient/individual. Parts of an image that represent non-structural objects which result from use of contrast agent, commonly called a "tagged element" or a "contrast-tagged element" of an image, usually have a higher brightness than parts of the image that represent other elements of the body (e.g. bones, surrounding tissue and the like).

The presence of one or more tagged elements in an image can distract a clinician viewing the medical image, e.g. by (partially) masking structural elements in the vicinity of the tagged element or by creating bright artefacts in the medical image. There is a known concept of suppression, in which tagged elements are effectively removed from a medical image, to improve an ease of the clinician in assessing the image.

As one example, during a computed tomography (CT) imaging process colonoscopy, the oral administration of contrast agent leads to tagging of stool residuals in the colon. This contrast-tagging can be used for digital suppression of the tagged stool residuals for viewing, such that the colon wall and possible polyps are better visible and not hidden by stool residuals.

There is an ongoing desire to improve the suppression of tagged elements in a medical image

SUMMARY OF THE INVENTION

The invention is defined by the claims.

According to examples in accordance with an aspect of the invention, there is provided a computer-implemented method of performing tagged element dilution (suppression) on a medical image having one or more tagged elements.

The computer-implemented method comprises: obtaining the medical image having one or more tagged elements, each tagged element being a part of the medical image that represents a material comprising a contrast agent; processing the medical image to generate a suppression image, the suppression image containing only the one or more tagged elements of the medical image; and combining the medical image and the suppression image to generate a processed medical image in which the apparent brightness of the one or more tagged elements is reduced to dilute, but not completely suppress, the tagged elements, compared to the medical image, but non-zero.

The present disclosure proposes to reduce the brightness of one or more tagged elements in a medical image, without completely removing the tagged elements in the medical image. This is achieved by generated a suppression image (containing the tagged elements) and appropriately combining the suppression image and the medical image. Use of the suppression image, containing the one or more tagged elements, allows manipulation, modification and/or weighting of the suppression image without affecting the content of the original medical image. By combining the two, the features of the original medical image can be preserved, whilst reducing the apparent brightness or appearance of the tagged elements. The present disclosure effectively provides a processed medical image in which the tagged elements are "diluted", rather than deleted, cleared or completely suppressed. This avoids the removal of potential valuable information (e.g. for contextual understanding or the like) of tagged elements in the medical image whilst reducing the impact that results from use of a contrast agent. In particular, the present invention proposes a new image processing technique for the reduction in the apparent brightness of tagged elements.

The proposed approach facilitates improved ease of identifying cysts, lesions, growths or imperfections (such or polyps or stool residuals) within a medical structure (in the medical image), without causing "blinding" by bright tagged elements. Additionally, the proposed approach still conveys information about the original location of tagged elements (as they are not entirely deleted), which facilitates improved contextual understanding of suppression artefacts and/or streaking artefacts. Moreover, by not entirely deleting the tagged elements, it is possible to identify the location of air (bubbles) in the medical image, as these will be represented by areas have a yet lower brightness than the tagged elements of the processed medical image.

By using the suppression image to only contain the one or more tagged elements, modifications to the tagged elements can be performed without affecting the brightness of other elements depicted in the (original) medical image. This facilitates more specific and directed brightness modifications.

The use of a suppression image (which is separate from the medical image) increases a flexibility in performing image processing of the medical image. In particular, the use of a suppression image allows for more complex and/or sophisticated image processing techniques to be employed.

For instance, one advantage of using a suppression image is increased ease and speed of changing the apparent brightness or visibility of the remaining opacity interactively, as only the suppression image needs to undergo image processing, e.g. without necessitating reprocessing of the whole image volume.

Another advantage is that it is possible to change the medical image "on the fly", e.g. allowing the same suppression image to be combined with a conventional CT Hounsfield image, or a virtual mon-energy-image from spectral CT, or yet another derived image—all of which depict the same region of interest for which a suppression image already identifies the tagged elements.

Yet another advantage is that the suppression image itself can be further processed before application or combination with the medical image, e.g. with respect to structure-sizes. For instance, thin structures could be less diluted than thick structures, or small structures less than thick structures.

In the context of the present disclosure, an "apparent brightness" is an intensity or brightness of an element of an image as it appears to a user. Thus, a pixel of an image having a higher apparent brightness will appear whiter than a pixel of the image having a lower apparent brightness. The concept of brightness is well established in the field of image processing.

Various mechanisms for reducing the apparent brightness of the tagged pixels by combining the medical image and the suppression image are envisaged by the present disclosure, as set out below.

The step of combining the medical image and the suppression image may be configured so that the apparent brightness of the one or more tagged elements in the processed medical image is less than the apparent brightness of one or more other elements in the processed medical image.

Thus, the brightness of the tagged elements in the processed medical image is made less than the brightness of non-tagged elements (i.e. elements that do not represent a material comprising a contrast agent) in the medical image. This further improves the visibility of the non-tagged elements, e.g. for assessment or analysis, without completely discarding potentially valuable information about the tagged elements.

The step of combining the medical image and the suppression image may comprise: modifying the suppression image to reduce the apparent brightness of the one or more tagged elements in the suppression image; combining the medical image and the modified suppression image to generate the processed medical image.

The computer-implemented method may be adapted wherein the step of combining the medical image and the suppression image comprises subtracting the modified suppression image from the medical image.

Optionally, the step of combining the medical image and the suppression image comprises multiplying the medical image and the modified suppression image together.

The step of modifying the suppression image may comprise reducing the value of one or more pixel parameters of all pixels representing a tagged element in the suppression image by a predetermined amount or by a predetermined percentage.

Images (including both 2D and 3D images) are formed from pixels, which can be alternatively labelled voxels for 3D images. Each pixel identifies one or more pixel values, representing the value of one or more different pixel parameters for the pixel. The number of pixel parameters for a pixel depends upon the format of the image. For instance, an RGB image will comprise at least three pixel parameters for a pixel, whereas a CT image may have only a single pixel parameter for a pixel (representing an HU value).

It is proposed that, the value of the pixel parameter(s) may be reduced by a predetermined amount. Thus, different pixel parameter(s) may be reduced by different predetermined amounts, but with the same reduction being applied to the same pixel parameter of all pixels.

This provides a flexible mechanism for reducing the apparent brightness of the tagged elements suppression image, or for modifying an appearance of the tagged elements in the suppression image.

The step of modifying the suppression image may further comprise performing a smoothing operation on the suppression image. Smoothing the suppression image improves the visual appearance of the one or more tagged elements, e.g. by making the edges of the one or more tagged elements blend with the other elements of the processed medical image.

The step of combining the medical image and the suppression image may comprise weighting the medical image and the suppression image during combination. This provides an alternative mechanism for combining the medical image and the suppression image that can reduce or modify the appearance of the tagged elements in the medical image.

The medical image may be a medical image of a colon and each tagged element represents a tagged stool in the colon. It is recognized that the proposed approach is particularly advantageous for reducing the appearance of stool in the colon, as it is recognized that tagged stool is particularly problematic in masking potential sites of imperfections, growths or conditions in the colon.

The medical image may be a computed tomography (CT) image. It is recognized that tagged elements in CT images are particularly problematic (during image analysis) due to the large difference in brightness between tagged elements and non-tagged elements, which significantly increases the difficulty in assessing or analyzing the tagged images. However, it will be appreciated that other medical image modalities could be processed using the proposed approach, e.g. magnetic resonance (MR) images (e.g. where tagged elements represent elements whose magnetic response has been perturbed during MR imaging, e.g. using an MRI contrast agent), X-ray images (e.g. where elements are tagged through use of a radiocontrast agent) or ultrasound images (e.g. using ultrasound contrast agents).

The computer-implemented method may further comprise displaying the processed medical image at a display. Alternatively, the processed medical image could be processed, e.g. using a machine-learning method or the like, to identify potential imperfections or areas of (medical) concern represented by the medical image. Of course, the processed medical image may be subject to further processing, e.g. noise reduction or the like. Thus, the method may comprise outputting the processed medical image to a further processing device.

The method may further comprise further processing the processed medical image using a machine-learning method to identify one or more characteristics of the medical image and/or the anatomical structure or structures represented by the medical image.

There is also proposed a computer-implemented method for generating one or more virtual medical images. The computer-implemented method comprises obtaining a first base medical image, the first base medical image having one or more tagged elements; obtaining a second base medical image, which was generated using a different imaging modality to the first base medical image, the second based medical image having one or more tagged elements, wherein the first and second base medical images are together usable for generating one or more virtual medical images; performing tagged element suppression on the first base medical image, by performing any previously described method, to generate a processed first base medical image; performing tagged element suppression on the second base medical image, by performing any previously described method, to generate a processed second base medical image; and processing the processed first and second base medical images to generate one or more virtual medical images.

The first and second base medical images may image a same region of interest of a patient, e.g. have a same virtual camera position and/or direction, but be obtained using different modalities (e.g. different energy levels used to generate the image).

There is also proposed a computer program product comprising computer program code means which, when executed on a computing device having a processing system, cause the processing system to perform all of the steps of any previously described method.

There is also proposed a processing system for performing tagged element suppression on a medical image having one or more tagged elements. The processing system is configured to: obtain the medical image having one or more tagged elements, each tagged element being a part of the medical image that represents a material comprising a contrast agent; process the medical image to generate a suppression image, the suppression image containing at least the one or more tagged elements of the medical image; and combine the medical image and the suppression image to generate a processed medical image in which the apparent brightness of the one or more tagged elements in the medical image is reduced to dilute, but not completely suppress, the tagged elements.

The medical image may be obtained, for example, from a medical image database or from a medical image generator (such as a CT scanner, MRI scanner or the like). The processed medical image may be output to a display (for displaying the processed medical image) or a further processor, e.g. for performing further image processing on the processed medical image or for analyzing the content of the processed medical image.

The processing system may be adapted to carry out any method herein described, and the skilled person would be able to adapt the processing system accordingly.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a mechanism for reducing the appearance of tagged elements in a medical image. This is achieved by processing the medical image to generate a separate, suppression image that contains only the tagged elements. The medical image and the suppression image are then combined to reduce the appearance of the tagged elements in the medical image. This can be achieved through modification of the suppressed image, before the combination, and/or weighting of the medical image and the suppression image during combination.

The present disclosure is based on the realization that tagged elements in a medical image can be extracted from other elements to form a separate suppression image, and that it is advantageous to make use of a second, separate image for processing the tagged elements separately from the other elements. In particular, it is recognized that use of a separate suppression image facilitates the use of more complex and/or sophisticated image processing techniques to be used, and to allow for greater flexibility (and less computational complexity) in the adjusting the apparent brightness of tagged elements in the medical image.

Embodiments may be employed, for example, to reduce the appearance of tagged stool in a CT image of the colon, without completely eradicating or deleting the stool (for improved ease of understanding, and reducing the likelihood that potentially valuable clinical information will be removed).

The proposed approaches for reducing the brightness or appearance of tagged elements (without completely removing the tagged elements) are able to generate an enhanced medical image, which provides more clinically relevant data for a clinician. In particular, a medical image is produced which more closely resembles a tagged-element free medical image (which is more clinically useful), whilst reducing the likelihood that subtraction artifacts will go unnoticed.

Figure 1:
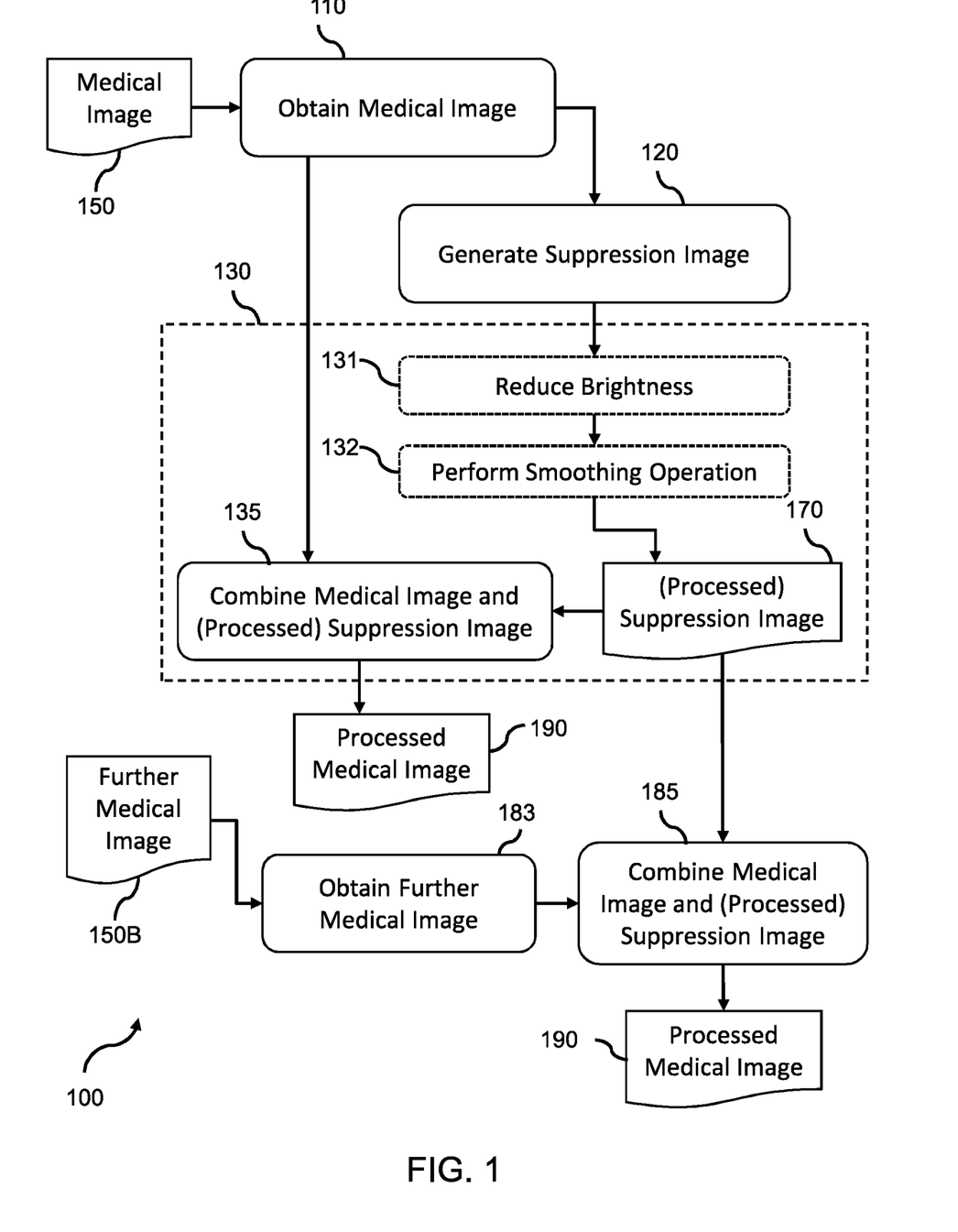
FIG. 1 illustrates a method according to an embodiment.

FIG. 1 illustrates a method 100 according to an embodiment of the invention.

The method comprises a step 110 of obtaining a medical image 150.

The medical image may be any suitable medical image that contains one or more tagged elements, such as a CT image in which areas representing stool have been tagged (e.g. are of a greater brightness) or an MR image in which areas representing blood have been tagged (sometimes called a "bright blood" image).

In particular, the medical image 150 may represent a region of interest in a patient. The medical image 150 may be a 2D image, a 3D image and/or a frame from a 2D/3D video or cineloop.

The skilled person would readily understand how to obtain a medical image having one or more tagged elements, and typically make use of a contrast agent or contrast medium to highlight, in the medical image, fluids, foreign bodies or digestive material (e.g. bolus, chime, chyle, stool, fecal matter and so on) that move through the body.

A tagged element may therefore represent matter that has been subject to a contrast agent/medium to appear to be more readily distinguishable, e.g. have a greater brightness (in the medical image), than if it had not been subject to the contrast agent/medium.

The method 100 processes the medical image 150 in a step 120 to generate a suppression image. The suppression image is an image (e.g. of the same resolution as the medical image) which contains only the tagged elements of the medical image. Thus, the suppression image may effectively be a version of the medical image in which only the tagged elements are copied across.

Step 120 may be carried out using a number of approaches. Generally, the step 120 may comprise identifying any tagged elements in the medical image and using this information to generate a "suppression image", which contains the tagged elements but is otherwise blank or zeroed.

For example, step 120 may comprise initializing a suppression image, having the same resolution of the medical image; identifying pixels of the medical image that correspond to tagged elements; and copying the pixel values of these pixels to corresponding pixels of the suppression image. The initialized suppression image may have predetermined values (e.g. 0) for all pixel values of the pixels.

In another approach, generating the suppression image may comprise copying the medical image (to generate an initial suppression image), and setting pixel values for all pixels that do not correspond to tagged elements to 0.

In one example, as tagged elements appear as having a large brightness, the suppression image may be generated by identifying all areas of the medical image having a brightness greater than some predetermined threshold. The suppression image may therefore be generated by using a simple thresholding process.

In some examples, tagged elements may be identified using an image segmentation technique. Any suitable image segmentation technique may be used, such as an edge detection approach (as tagged elements should have clear, bright edges), a model-based segmentation technique (such as that disclosed by the International Patent Application having publication numbers WO 2018/224363 A1), a thresholding based segmentation technique (such as that disclosed by the International Patent Application having publication number WO 2007/046019 A1), or a deep learning approach, i.e. an approach that employs a machine-learning method such as making use of one or more convolutional neural networks (CNNs).

Of course, a combination of these techniques could be used.

The method 100 then performs a process 130 of combining the medical image 150 and the suppression image to generate a processed medical image 190. The process 130 is configured so that the tagged elements, in the processed medical image, have an apparent brightness of the one or more tagged elements which is reduced, compared to the medical image, but non-zero.

This process 130 can be achieved by carrying out one of a variety of approaches.

In one example, the medical image and the suppression image could be directly combined, e.g. averaged, multiplied or by subtracting the suppression image from the medical image (e.g. in a step 135), during which the medical image and/or the suppression image are appropriately weighted to reduce the apparent brightness of the tagged elements.

For instance, consider a scenario in which the step of combining the medical image and the suppression image uses a subtraction approach, in which the pixel value of each pixel of the combined medical image is the (weighted) pixel value for the equivalent pixel of the suppression image subtracted from the (weighted) pixel value for the equivalent pixel of the medical image. In this scenario, if all pixel values of the medical image are weighted by X, with all pixels values pixel of the suppression image being weighted by Y, then the resulting pixel values for tagged elements of the medical image are (Y-X) times the pixel value of the medical image. This effectively reduces the apparent brightness of the tagged elements compared to the medical image.

In a preferred example, the process 130 comprises a step 131 of reducing an apparent brightness of the suppression image before combining (by subtraction or multiplication) the medical image and the suppression image. This can allow for improved control over the brightness of the tagged elements in the processed image.

In particular, the apparent brightness of the suppression image is reduced so that, when subtracted from or multiplied with the medical image, the appearance of the tagged elements is reduced but non-zero. In other words, the tagged elements will still be visible in the processed image, but of a lesser brightness.

The process for reducing the apparent brightness may depend upon the type of the suppressing image. For instance, if the suppression image is an intensity map (e.g. a CT Hounsfield image), reducing the brightness may simply comprise reducing the single pixel value of each pixel. As another example, if the suppression image is an RGB image, reducing the brightness may comprise reducing the R value, the G value and the B value of each pixel and/or adjusting (if present) an alpha or a value of each pixel (which defines a transparency of a pixel).

The amount of brightness reduction may, for instance, be responsive to a user input or predetermined. Preferably, the amount of brightness reduction is responsive to a user input at a user interface, to allow the user a level of control over the apparent brightness of the tagged elements. The use of a suppression image is particularly advantageous when relying upon a user input for defining the amount of brightness reduction, as it allows for simple regeneration of the processed medical image without needing to completely reprocess the original medical image.

In some examples, the value of one or more pixel parameters of all pixels representing a tagged element in the suppression image may be reduced by a predetermined amount or by a predetermined percentage.

The amount of brightness reduction need not be uniform across all pixels of the suppression image. In some examples, different tagged elements are reduced in brightness by different amounts. For instance, thin tagged elements may be reduced in brightness less than thick tagged elements (to reduce the likelihood that the thin tagged elements will be missed by a clinician) and/or small tagged element may be reduced in brightness less than a larger tagged element.

Thus, the amount of brightness reduction for pixels of the suppression image may depend upon a size and/or shape of the tagged element to which the pixel belongs.

The step of combining 130 may comprise combining, in a step 135, the suppression image and the medical image by subtracting the suppression image from the medical image or multiplying the medical image and the suppression image together.

Preferably, the process 130 comprises a step 132 of performing a smoothing operation on the suppression image (before combining with the medical image). Imaging smoothing operations are well known to the skilled person, and may employ applying one or more smoothing filters to the suppression image.

Use of a smoothing operation improves the visual appearance of the processed medical image, by reducing the appearance of any sharp or abrupt changes in brightness between tagged elements of the processed image and non-tagged element. This reduces the appearance of artefacts in the processed medical image (e.g. at these sudden gradients or changes), thereby providing a closer representation to a true tagged-element free image of the region of interest represented by the processed medical image.

A smoothing operation further demonstrates the advantage of the use of a separate, suppression image, as the smoothing operation is performed on only the tagged elements, for improved visual appearance and reduction of artefacts, without losing detail in other parts of the medical image (which would occur if performing a smoothing operation on the medical image as a whole).

The step of combining 130 may comprise performing other processing steps (e.g. denoising, coloring and so on). This may be in addition to or instead of the step 132 of performing smoothing.

Thus, use of a suppression image allows additional processing to be performed on the tagged elements (e.g. smoothing or denoising) to produce a processed suppression image 170 without affecting the other components of the medical image. This provides a new mechanism for image processing the tagged elements without affecting the other components of the medical image.

Use of a separate suppression image is also advantageous in that the same suppression image could be applied to different versions of the medical image (e.g. medical images of the same region of interest, but taken using a different imaging modalities). This can reduce a workload in generating processed medical images by reusing or repurposing suppression images generates for other medical images of the same region of interest.

Thus, in some embodiments, once a suppression image has been generated (and optionally processed) for a particular medical image, the same suppression image may be combined with other medical images of the same region of interest to reduce the brightness of the tagged elements in the other medical images.

Similarly, the same suppression image could be combined with different derivations from the original medical image (e.g. a further processed medical image, such as a virtual noncalclium medical image, a virtual noncontrast image) and so on.

The method 100 may further comprise a step 183 of obtaining a further medical image 150B (which may be an image derived from the medical image 150 and/or an image taken at a same location as the medical image 150). The further medical image 150B and the (processed) suppression image 170 may be combined in a process 185, e.g. which may be analogous to the combination process 130, to generate a processed further medical image.

Thus, the suppression image 170 may be reused to combine with other medical images, such as those derived from the original medical image.

The present disclosure proposes approaches for generating a processed medical image in which a suppression image is generated from a medical image, the suppression image containing only the tagged elements of the medical image. This facilitates reuse of the suppression image and dedicated image processing of tagged elements (by image processing the suppression image). This approach also facilitates simple adjustment to the brightness of the tagged elements in the processed medical image (e.g. by adjusting the brightness of the suppression image or adjusting the weighting of the suppression image during combination) without needing to completely reprocess the original medical image.

The processed medical image, in which the brightness/appearance of tagged elements is reduced but non-zero, allows a clinician to more readily identify inconsistencies or features of the anatomical structure represented by the processed medical image without being "blinded" by the tagged elements, whilst still retaining an ability to distinguish between tagged elements and air bubbles and to identify a cause for artifacts resulting from tagged elements in the processed medical images.

The processed medical image may be displayed, e.g. at a user interface, and/or further processed (e.g. using a machine-learning method) to identify one or more characteristics about the medical image and/or the region of interest represented by the medical image. For instance, a processed medical image of the colon may be further processed, e.g. using a machine learning method, to identify the presence and/or characteristics of one or more polyps present in the colon.

Thus, the method 100 may comprise a step of displaying the processed medical image, e.g. at a user interface. Similarly, the method 100 may comprise a step of further processing the medical image, e.g. to perform characteristic determination, analysis and/or classification of the medical image and/or a region of interest represented by the processed medical image.

In some examples, the method may comprise a step of performing further image processing on the processed medical image, e.g. denoising or the like. The further processed medical image may then be displayed, e.g. at the user interface.

Of course, the method may be configured to operate in a mode in which the tagged elements are completely suppressed (i.e. the values of the tagged elements in the processed medical image are 0). This mode can be toggled, for example, responsive to a user input.

Figure 2:
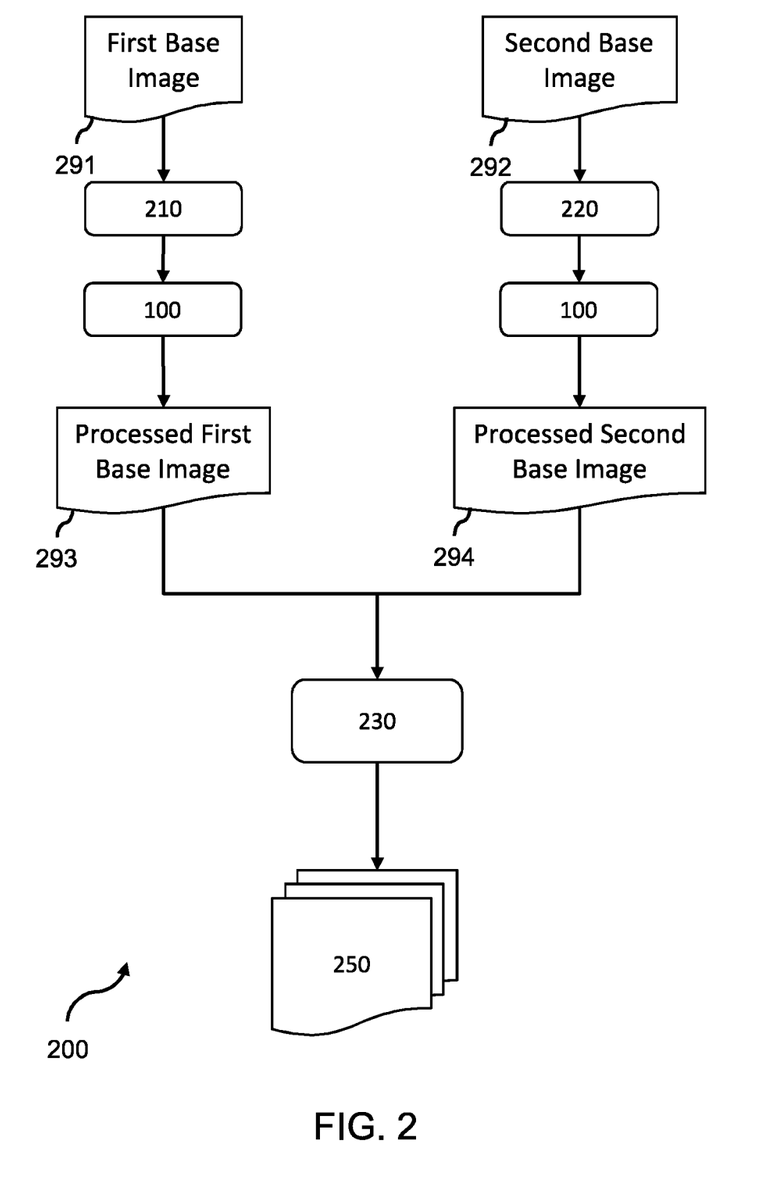
FIG. 2 illustrates a method according to an embodiment.

FIG. 2 illustrates an application of the method for generating a virtual medical image. In particular, FIG. 2 illustrates a method 200 of generating one or more virtual medical images.

The method 200 comprises a step 210 of obtaining a first base medical image 291, the first base medical image having one or more tagged elements.

The method 200 further comprises a step 220 of obtaining a second base medical image 292, which was generated using a different imaging modality to the first base medical image, the second based medical image having one or more tagged elements, wherein the first and second base medical images are together usable for generating one or more virtual medical images.

In other words, the first and second base medical images are designed so that they can be combined to synthesize a new, virtual medical image.

By way of example only, the first base medical image 291 may be a CT image obtained using a first energy level (of emitted X-rays) and the second base medical image 292 may be a CT image obtained using a second, different energy level (of emitted X-rays). These two base images may be capable of being blended at different ratios to generate different virtual mono-energy images. This allows for the synthesis of medical images having a hypothetical energy level, i.e. functionally equivalent to the medical image that would result from an acquisition with X-ray beams at the hypothetical energy level. Both base medical images represent a same region of interest, i.e. contain the same elements, different but are taken with different imaging modalities, e.g. for CT images—taken using X-rays of energy levels.

The method 100 described by the present disclosure is then performed on each medical image to generate respective processed base images. Thus, the method 200 comprises performing tagged element suppression 100 on the first base medical image 291, to generate a processed first base medical image 293 and performing tagged element suppression 100 on the second base medical image to generate a processed second base medical image 294.

The processed first 293 and second 294 base medical images are then together processed to generation or synthesize one or more virtual medical images 250. Mechanisms for synthesizing a virtual medical image from base images are well known to the skilled person, and may employ a decomposition process amongst other processes.

For instance, methods for generating a virtual monoenergetic image from two base (CT) medical images obtained using different energy levels are described by Matsumoto, Kazuhiro, et al. "Virtual monochromatic spectral imaging with fast kilovoltage switching: improved image quality as compared with that obtained with conventional 120-kVp CT." Radiology 259.1 (2011): 257-262 and D'Angelo, Tommaso, et al. "Dual energy computed tomography virtual monoenergetic imaging: technique and clinical applications." The British journal of radiology 92.1098 (2019): 20180546.

Other approaches for synthesizing a virtual medical image from two base medical images will be apparent to the skilled person.

Thus, it will be understood that the proposed approach for reducing the appearance of tagged elements in a medical image can be exploited to generate one or more virtual images in which the appearance of tagged elements is similarly reduced (but non-zero).

Figure 3:
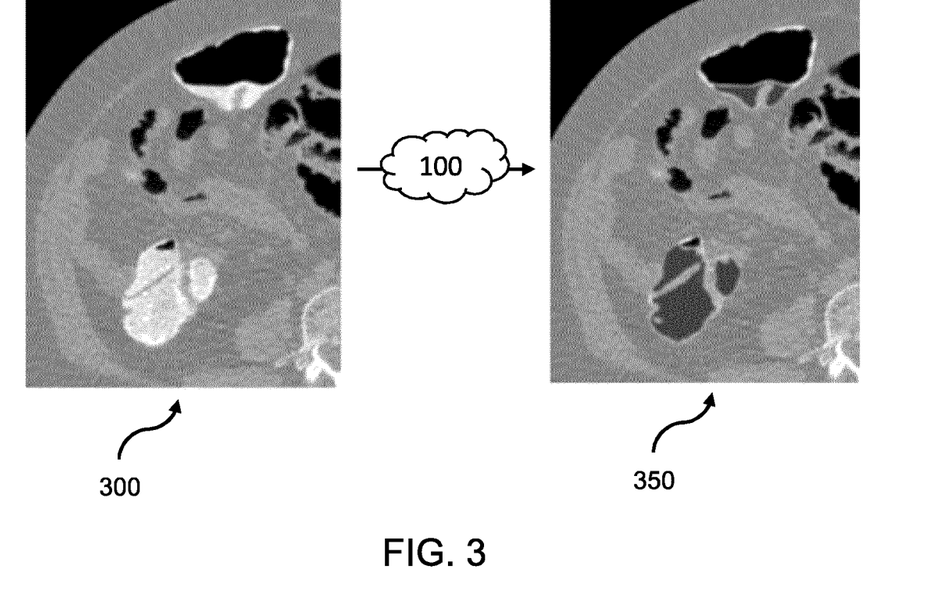
FIG. 3 illustrates a medical image undergoing a method according to an embodiment.

FIG. 3 illustrates an effect of performing a method according to an embodiment on an example medical image 300.

The medical image 300 is a CT Hounsfield image of a colon, which includes multiple tagged elements, as indicated by the brightest areas of the medical image 300. When the medical image 300 is subject to the herein described approach, e.g. following the method 100 described with reference to FIG. 1, a processed medical image 350 is produced.

The processed medical image 350 still contains the tagged elements (i.e. they have not been deleted or are non-zero), but their apparent brightness has been reduced. The difference of the diluted tagged areas to air bubbles remains intuitively recognizable.

Figure 4:
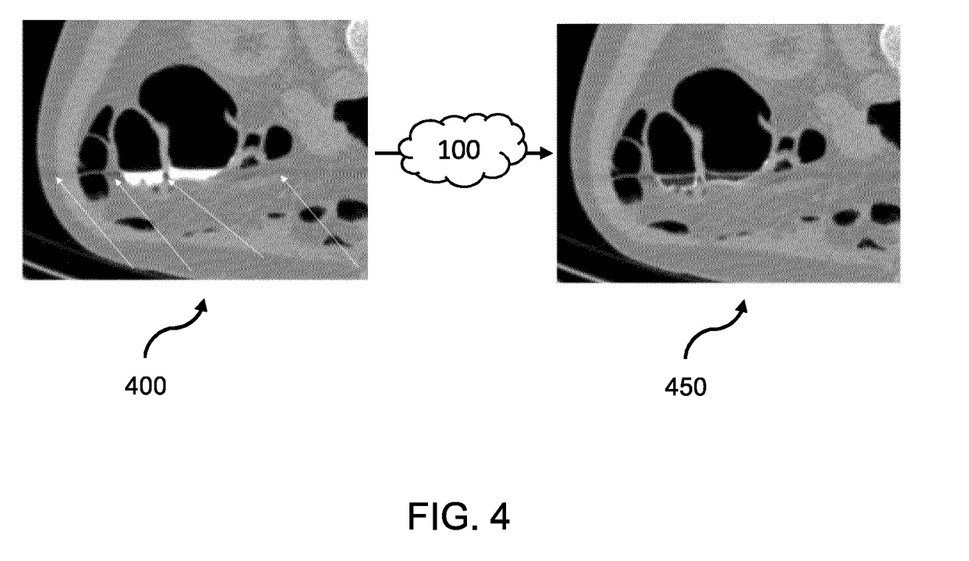
FIG. 4 illustrates another medical image undergoing a method according to an embodiment.

FIG. 4 illustrates an effect of performing a method according to an embodiment on another example medical image 400.

The medical image 400 is another example of a CT Hounsfield image of a colon, including multiple tagged elements, indicated by the brightest areas of the medical image 400. The medical image 400 exhibits strong streaking artifacts (indicated by arrows), caused by the high absorption of the contrast material. The beam hardening artifacts lead to spurious apparent cavities in the colon folds, and the surrounding soft tissue.

A processed medical image 450 results from performing a herein described method, such as the method 100 described with reference to FIG. 1, on the medical image 400.

The streaking artifacts are still present in the processed medical image 450. However, however, since the original location of the tagged element(s) is/are still visible (as the brightness of the tagged elements is non-zero), the cause of the artifacts is still illustrated/visible, and therefore intuitive to the viewer.

Thus, the proposed approach provides an image that retains information useful for aiding a clinician in making a correct clinical decision, by providing information on the cause of potential artefacts in the image that might otherwise confuse and/or mislead the clinician (to make an incorrect diagnosis).

Figure 5:
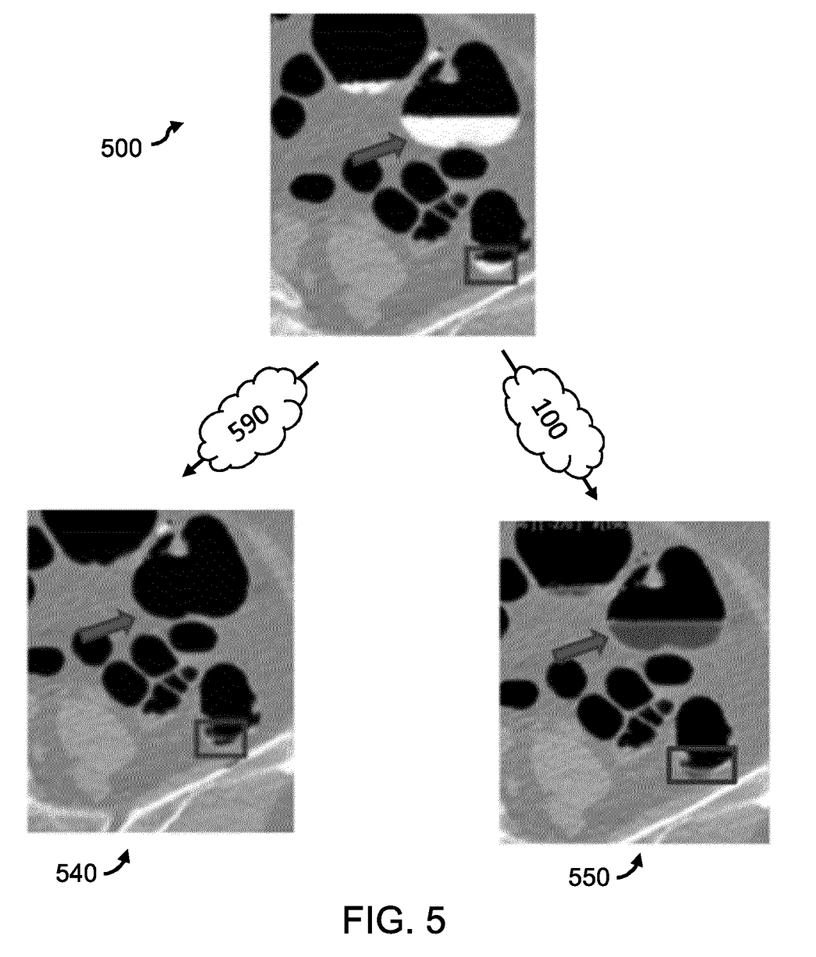
FIG. 5 illustrates yet another medical image undergoing a method according to an embodiment, compared to an existing method.

FIG. 5 illustrates a comparison between performing a method 100 according to an embodiment of the invention on a medical image 500 and a method 590 according to a prior art technique.

When the medical image 500 is processed using a method 590 according to a prior art technique, all tagged elements are completely removed from the medical image, to produce a first processed medical image 540. This process is called "suppression" of tagged elements.

When the medical image 500 is processed using a method 100 according to an embodiment of the invention, e.g. as described with reference to FIG. 1, the brightness of tagged elements is reduced but not zero. This process can be called "partial suppression" of tagged elements. Thus, the tagged elements are effectively "diluted", rather than removed.

This produces a second processed medical image 550.

In the first processed medical image 540, the removal of the tagged elements leaves cleansing artifacts at the boundary of the cleansed area. These cleansing artifacts can mislead a clinician, and fail to provide a true representation of the imaged region of interest. In the second process medical image 550, the cause of any surface artefacts attributed to the partial suppression can be readily identified (e.g. by the presence of the less bright tagged elements). This avoids misleading a clinician into attributing artifacts to imperfections of the colon, instead providing them with useful clinical information for aiding them in identifying the presence and cause of artifacts to improve the performance of assessing and/or diagnosing the patient.

Figure 6:
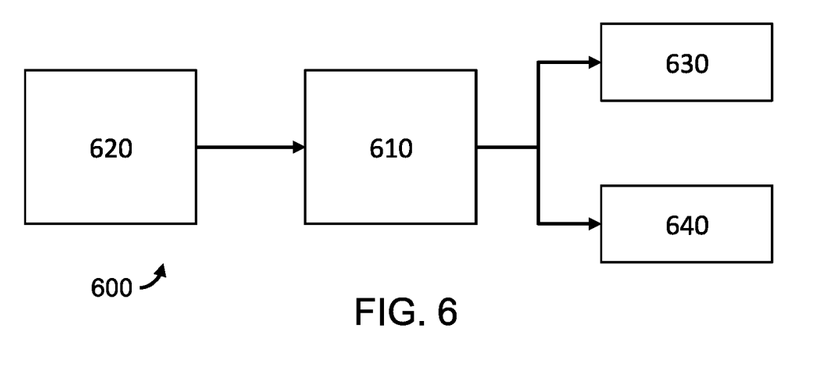
FIG. 6 illustrates a processing system.

FIG. 6 illustrates a processing arrangement 600 according to an embodiment. The processing arrangement 600 includes a processing system 610, which is itself an embodiment of the invention.

The processing system is configured to perform tagged element suppression on a medical image having one or more tagged element.

In particular, the processing system 610 is configured to obtain the medical image having one or more tagged elements, each tagged element being a part of the medical image that represents a material comprising a contrast agent. The processing system 610 may obtain the medical image from a memory 620 (of the processing arrangement 600) and/or directly from a scanner (not shown).

The processing system is configured to process the medical image to generate a suppression image, the suppression image containing at least the one or more tagged elements of the medical image; and combine the medical image and the suppression image to generate a processed medical image in which the apparent brightness of the one or more tagged elements in the medical image is reduced but non-zero.

Thus, the processing system 610 may be configured to carry out any herein described method for generating the processed medical image.

The processing arrangement 600 may further comprise a display 630. The processing system may be configured to display the processed medical image (and optionally the medical image and/or the suppression image) at the display 630.

The processing arrangement 600 may further comprise a further processor 640. The further processor may be configured to perform further processing of the processed medical image, e.g. denoising, analysis and so on. Information and/or images produced by the further processor (e.g. the outcome of the further processing) may be displayed at the display 630, and the further processor may be configured accordingly.

The skilled person would be readily capable of developing a processing system for carrying out any herein described method. Thus, each step of a flow chart may represent a different action performed by a processing system, and may be performed by a respective module of the processing system.

As discussed above, the system makes use of processing system to perform the data processing. The processing system can be implemented in numerous ways, with software and/or hardware, to perform the various functions required. The processing system typically employs one or more microprocessors that may be programmed using software (e.g., microcode) to perform the required functions.

The processing system may be implemented as a combination of dedicated hardware to perform some functions and one or more programmed microprocessors and associated circuitry to perform other functions.

Examples of circuitry that may be employed in various embodiments of the present disclosure include, but are not limited to, conventional microprocessors, application specific integrated circuits (ASICs), and field-programmable gate arrays (FPGAs).

In various implementations, the processing system may be associated with one or more storage media such as volatile and non-volatile computer memory such as RAM, PROM, EPROM, and EEPROM. The storage media may be encoded with one or more programs that, when executed on one or more processing systems and/or controllers, perform the required functions. Various storage media may be fixed within a processing system or controller or may be transportable, such that the one or more programs stored thereon can be loaded into a processing system.

Thus, there is also proposed a computer program product comprising computer program code means which, when executed on a computing device having a processing system, cause the processing system to perform all of the steps of the method Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

A single processor or other unit may fulfill the functions of several items recited in the claims. A computer program may be stored/distributed on a suitable medium, such as an optical storage medium or a solid-state medium supplied together with or as part of other hardware, but may also be distributed in other forms, such as via the Internet or other wired or wireless telecommunication systems.

If the term "adapted to" is used in the claims or description, it is noted the term "adapted to" is intended to be equivalent to the term "configured to". Any reference signs in the claims should not be construed as limiting the scope.

The invention claimed is:

1. A computer-implemented method of performing tagged element dilution on a medical image having one or more tagged elements, the computer-implemented method comprising:
   obtaining the medical image having the one or more tagged elements, each tagged element being a part of the medical image that represents a material comprising a contrast agent;
   processing the medical image to generate a suppression image, the suppression image containing only the one or more tagged elements of the medical image; and
   combining the medical image and the suppression image to generate a processed medical image in which apparent brightness of the one or more tagged elements is reduced to dilute, but not completely suppress, the tagged elements, compared to the medical image.

2. The computer-implemented method of claim 1, wherein combining the medical image and the suppression image is configured so that the apparent brightness of the one or more tagged elements in the processed medical image is less than the apparent brightness of one or more other elements in the processed medical image.

3. The computer-implemented method of claim 1, wherein combining the medical image and the suppression image comprises:
   modifying the suppression image to reduce the apparent brightness of the one or more tagged elements in the suppression image, whereby the modified suppression image is obtained;
   combining the medical image and the modified suppression image to generate the processed medical image.

4. The computer-implemented method of claim 3, wherein combining the medical image and the suppression image comprises subtracting the modified suppression image from the medical image.

5. The computer-implemented method of claim 3, wherein combining the medical image and the suppression image comprises multiplying the medical image and the modified suppression image together.

6. The computer-implemented method of claim 3, wherein modifying the suppression image comprises reducing a value of one or more pixel parameters of all pixels representing a tagged element in the suppression image by a predetermined amount or by a predetermined percentage.

7. The computer-implemented method of claim 3, wherein modifying the suppression image further comprises performing a smoothing operation on the suppression image.

8. The computer-implemented method of claim 1, wherein combining the medical image and the suppression image comprises weighting the medical image and the suppression image during combination.

9. The computer-implemented method of claim 1, wherein the medical image is a medical image of a colon, and each tagged element represents a tagged stool in the colon.

10. The computer-implemented method of claim 1, wherein the medical image is a computed tomography image.

11. The computer-implemented method of claim 1, further comprising displaying the processed medical image at a display.

12. The computer-implemented method of claim 1, further comprising further processing the processed medical image using a machine-learning method to identify one or more characteristics of the medical image and/or anatomical structure or structures represented by the medical image.

13. A system for performing tagged element dilution on a medical image having one or more tagged elements, the system comprising:
   a memory that stores a plurality of instructions; and
   a processor coupled to the memory and configured to execute the plurality of instructions to:
      obtain the medical image having the one or more tagged elements, each tagged element being a part of the medical image that represents a material comprising a contrast agent;
      process the medical image to generate a suppression image, the suppression image containing at least the one or more tagged elements of the medical image; and
      combine the medical image and the suppression image to generate a processed medical image in which apparent brightness of the one or more tagged elements in the medical image is reduced to dilute, but not completely suppress, the tagged elements.

14. A non-transitory computer-readable medium for storing executable instructions, which cause a method to be carried out to perform tagged element dilution on a medical image having one or more tagged elements, the method comprising:
    obtaining the medical image having the one or more tagged elements, each tagged element being a part of the medical image that represents a material comprising a contrast agent;
    processing the medical image to generate a suppression image, the suppression image containing only the one or more tagged elements of the medical image; and
    combining the medical image and the suppression image to generate a processed medical image in which apparent brightness of the one or more tagged elements is reduced to dilute, but not completely suppress, the tagged elements, compared to the medical image.

* * * * *